J. HOBSON.
Apparatus for Preserving Birds' Eggs.
No. 157,519. Patented Dec. 8, 1874.
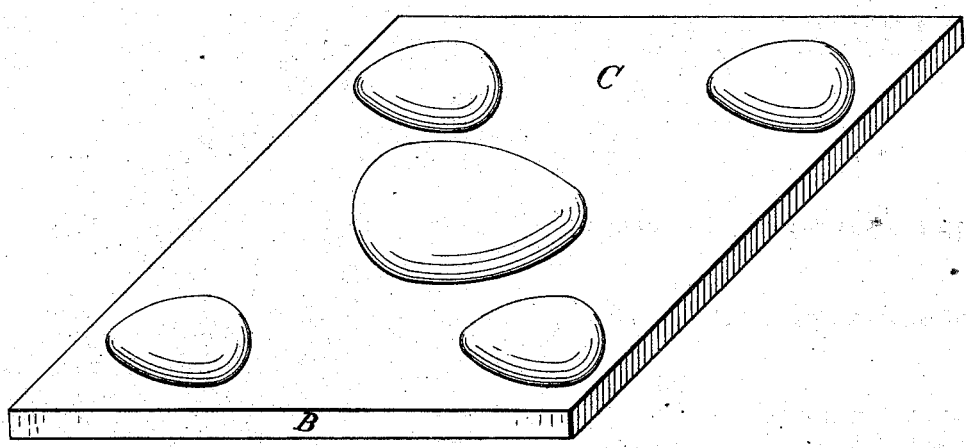
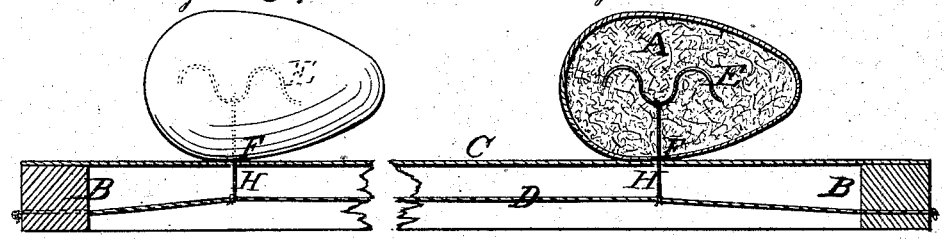
WITNESSES
INVENTOR

UNITED STATES PATENT OFFICE.

JAMES HOBSON, OF DETROIT, MICHIGAN.

IMPROVEMENT IN APPARATUS FOR PRESERVING BIRDS' EGGS.

Specification forming part of Letters Patent No. 157,519, dated December 8, 1874; application filed July 22, 1874.

*To all whom it may concern:*

Be it known that I, JAMES HOBSON, of the city of Detroit, in the county of Wayne and State of Michigan, have invented a new and Improved Apparatus for Preserving and Preventing the Breakage of Birds' Eggs; and I do hereby declare that the following is a full and exact description of the same.

The nature of my invention consists in a new apparatus for fixing eggs in collections, and is so arranged as to prevent their breakage, as well as to aid in a tasteful arrangement in cabinets; also, by this method they can be transported to any part of the world in perfect safety.

Figure 1 is a perspective view of a frame with eggs mounted, the letter C showing the cloth or other soft material; and B the frame, which may be made of wood.

Fig. 2 is a section of an egg, and of the frame, showing the inside arrangement, letter A being the cotton filling inside of the egg.

Fig. 3 is an outside view of an egg fixed to the frame, letter B being the frame, and D a string attached to the frame, to which the egg is fixed.

Fig. 4 shows the thread attached to the hooked or spiral wire. H is the thread; E, the spiral wire.

Fig. 5 is an end view of the spiral wire E.

To enable others skilled in the art to make and use my invention, I will proceed to describe its construction and operation.

After the egg has been emptied through the hole, which is at F, the egg must be cleaned with water and dried. Cotton is introduced through the same hole to fill half of the egg, then the spiral wire is introduced by turning it, and the egg filled with cotton. The egg is fastened to the frame by the thread H to the string D.

What I claim as my invention, and desire to secure by Letters Patent, is—

The bird's-egg protector herein described, consisting essentially of the frame B, covered with cloth C, and provided with the strings D, in combination with the hook or spiral wire E and cords H, substantially as and for the purposes set forth.

JAMES HOBSON.

Witnesses:
WILLIAM WEBSTER,
JOHN RAIRDEN.